United States Patent [19]

Moffatt

[11] 4,334,165

[45] Jun. 8, 1982

[54] COPPER-STEEL COMPOSITE COMMUTATOR BAR

[75] Inventor: William G. Moffatt, Ballston Lake, N.Y.

[73] Assignee: General Electric Company, Schenectady, N.Y.

[21] Appl. No.: 122,528

[22] Filed: Feb. 19, 1980

[51] Int. Cl.$^3$ .......... H02K 13/10

[52] U.S. Cl. .......... 310/233; 29/597

[58] Field of Search .......... 310/233-237, 310/219-221, 42, 232, 128, 135, 136; 29/597, 733; 174/138, 138 C

[56] References Cited

U.S. PATENT DOCUMENTS

| | | | |
|---|---|---|---|
| 3,478,421 | 11/1969 | Preece | 310/237 |
| 3,538,365 | 11/1970 | Reisnecker | 310/237 |
| 3,705,997 | 12/1972 | Bauerle | 310/237 |

FOREIGN PATENT DOCUMENTS

| | | | |
|---|---|---|---|
| 510345 | 10/1930 | Fed. Rep. of Germany | 310/233 |
| 1071852 | 6/1967 | United Kingdom | 310/233 |
| 2013415 | 8/1979 | United Kingdom | 310/233 |

*Primary Examiner*—R. Skudy

*Attorney, Agent, or Firm*—Stephen S. Strunck; James C. Davis; Joseph T. Cohen

[57] ABSTRACT

An electrical commutator having a plurality of spaced apart commutator bars is disclosed. The commutator bars are formed from a composite of an electrically conductive copper portion bonded, for example by brazing or electron beam welding, at an interface to a steel body which is geometrically designed to reduce the bending and longitudinal stiffness of the body, whereby the shear stress at the interface is reduced during operation.

22 Claims, 5 Drawing Figures

COPPER-STEEL COMPOSITE COMMUTATOR BAR

BACKGROUND OF THE INVENTION

The present invention relates to improved electrical commutators for large d.c. motors which typically have an output of greater than 500 horsepower. More particularly, it relates to novel composite commutator bars which have improved resistance to interface delamination and provide economic advantages.

Heretofore, electrical devices such as commutators were made from solid copper. In large d.c. motors there are a plurality of spaced commutator bars which may be one to two feet long. Thus the amounts of copper used in the complete commutator is considerable and becomes quite costly. Accordingly, it has been proposed to reduce the copper content by substituting duplex commutator bars made by bonding a copper strip to a steel stock. Such duplex bars were made by a number of techniques, such as pressed and sintered powders, electron beam welding and brazing. However, the specific process by which the copper is bonded to the steel does not overcome the fundamental problem with the duplex bar construction, which is that of high interface shear stresses resulting from differential thermal expansion of the two metals as temperature changes occur during motor operation. This causes delamination of the duplex bar and rapid failure of the commutator.

SUMMARY OF THE INVENTION

In accordance with the present invention, I have discovered an improved electrical commutator for use in large d.c. motors, typically having a rating of at least 500 h.p. The commutator is comprised of a plurality of circumferentially spaced duplex bars having a length of about 12 to 24 inches. These duplex bars are formed from a composite of an outer (electrically conductive) copper portion bonded at an interface to a low carbon steel body which is geometrically designed to reduce the bending and longitudinal stiffness of the body. This novel structure reduces the high interface shear stresses due to differential thermal expansion of the two metals as temperature changes occur during motor operation and thereby avoids delamination.

BRIEF DESCRIPTION OF THE DRAWING

The invention is more clearly understood from the following description taken in conjunction with the accompanying drawing.

DESCRIPTION OF THE PREFERRED EMBODIMENT

Figure 1:
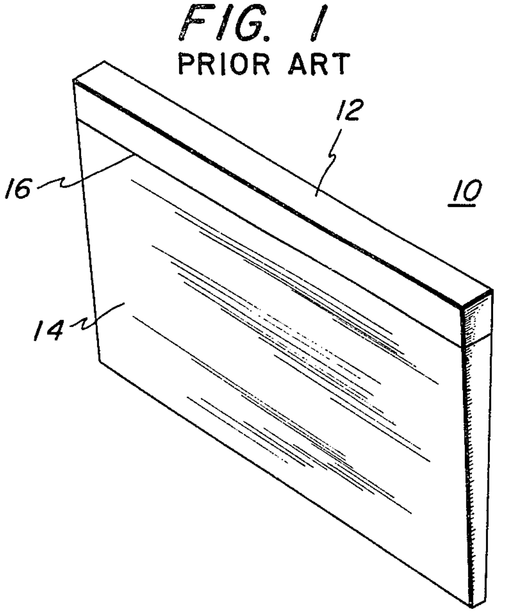
FIG. 1 PRIOR ART
FIG. 1 is a three dimensional view of a duplex commutator bar having an outer copper portion bonded to a steel body.

Referring to FIG. 1, an attempt to modify the prior art commutator bar made entirely of copper by forming a duplex commutator bar 10 is represented as having a copper outer portion 12 bonded directly to an iron base alloy body or substrate 14 at an interface 16. A plurality of such bars 10 are assembled and circumferentially spaced to form a complete commutator of a direct current motor. During operation of the motor, considerable heat is generated whereby high shear stresses are created at the interface 16 of each commutator bar 10 because of the mismatch of thermal expansion ($\Delta\alpha$) of the two different metals. Specifically, the expansion coefficients ($\alpha$) over a temperature range of 20°-100° C. are as follows:

| Metal | Coefficient of Exp. (in/in/°C.) |
|---|---|
| Copper (ETP) | $168 \times 10^{-7}$ |
| Low Carbon Steel (SAE 1022) | $117 \times 10^{-7}$ |

The significance of the problem is illustrated by calculating the expansion mismatch, $$\Delta L = L_{Cu,T} - L_{steel,T}$$

of a composite Cu/steel bar of original length $L_o$ as it is heated from ambient temperature $T_o$ to some elevated temperature, T.

If the copper and steel portions were not attached and free to expand, the lengths $L_{Cu,T}$ and $L_{steel,T}$ would be given by:

$$L_{Cu,T} = L_o\alpha_{Cu}(T - T_o) = L_o\alpha_{Cu}\Delta T$$

$$L_{steel,T} = L_o\alpha_{steel}(T - T_o) = L_o\alpha_{steel}\Delta T$$

$$\text{Then } \Delta L = L_{Cu,T} - L_{steel,T} = L_o\alpha_{Cu}\Delta T - L_o\alpha_{steel}\Delta T$$

$$= L_o\Delta T\Delta\alpha$$

$$\text{For } \Delta T = 100° \text{ C.}, \Delta\alpha = 51 \times 10^{-7} \frac{\text{in}}{\text{in °C.}}, L_o = 24\text{in}$$

$$\Delta L = (24\text{in.}) \cdot (100° \text{ C.}) \cdot \left(51 \times 10^{-7} \frac{\text{in}}{\text{in °C.}}\right)$$

$$\Delta L = 0.01224 \text{ inches}$$

By virtue of being bonded at the interface the copper and steel portions are not free to assume the elevated temperature lengths they would have if unbonded; that is at either side of the bonded interface, both the copper and the steel must have the same length unless delamination occurs. This common length would be less than the free length of copper and greater than the free length of steel; the stresses which are operative to enforce a common length at the interface are transferred through a shear stress at the interface.

The relative partition of the mismatch, between Cu and steel, depends on the relative stiffness of the copper and steel members. For example, if the steel part is a very deep and hence stiff beam requiring high stress to cause bending, and the copper is a very thin layer, the latter will not be capable of enforcing any significant stretching of the steel. The consequence will be that high shear stresses will develop at the interface during thermal cycling, ultimately resulting in failure at the bond interface.

An exact calculation of the interface shear stress is quite complex. But the seemingly small mismatch, 0.01224 inches in a 24 inch length for a 100° C. temperature rise corresponds to development of stresses of significant magnitude. For example, if the copper and steel were not bonded, the stress required for each 0.005″ compression of copper or 0.005″ extension of steel would be $$\sigma_{Cu} = E_{Cu}\epsilon_{Cu} = 16 \times 10^6 \frac{\text{lb}}{\text{in}^2} \times \frac{.005''}{24''} = 3{,}333 \frac{\text{lb}}{\text{in}^2}$$

$$\left(\text{where the strain } \epsilon_{Cu} = \frac{L_{Cu} - L_o}{L_o}\right) \text{ and}$$

$$\sigma_{steel} = E_{steel}\epsilon_{steel} = 30 \times 10^6 \frac{\text{lb}}{\text{in}^2} \times \frac{.005''}{24''} = 6{,}250 \frac{\text{lb}}{\text{in}^2}$$

Clearly, for a fixed $L_o$ and fixed $\Delta\alpha$, $\Delta L$ increases with $\Delta T$ since $\Delta L = L_o \Delta T \Delta\alpha$.

Figure 2:
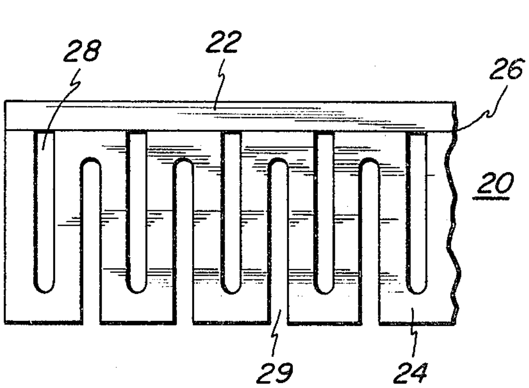
FIG. 2 is a side view of a duplex commutator bar of the present invention including a stress relieving design.

This problem has been solved, according to my novel invention, by using the duplex commutator bar 20 shown in FIG. 2. The bar 20 has a copper outer portion or layer 22 bonded by conventional techniques, such as brazing or electron beam welding, to a low carbon steel body 24 at an interface 26. There are a plurality of slots 28 forming upper expansion joints and a plurality of slots 29 forming lower expansion joints which serve to reduce the structural integrity of the steel body 24 and to isolate the expansion mismatch stresses. Thus, interface 26 is actually a series of interface regions, areas or lengths between slots 28, which may, or may not, be uniformly spaced. Shearing is prevented at the interface 26 as long as the stresses arising at the interface are not significantly greater than the stresses arising by the expansion mismatch over these interface regions. Another explanation is that the slots 28 and 29 serve to reduce the longitudinal stiffness of the steel body 24 to permit it to increase or decrease in length together with the copper outer layer 22, while not imposing very large shear strains at the interface.

Figure 3:
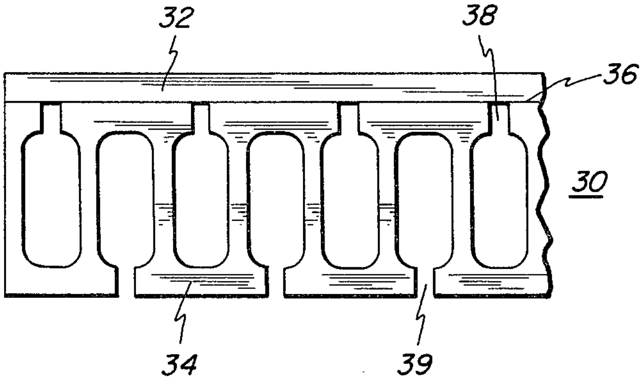
FIG. 3 is a side view of an alternative embodiment of the present invention.

An alternative embodiment of my invention is shown in FIG. 3. The duplex commutator bar 30 has a copper outer portion 32 bonded to a low carbon steel body 34 at interface 36. The upper expansion joints 38 and the lower expansion joints 39 have been modified to appear having a shape much like a bottle with a narrow neck. This configuration permits greater movement of the steel body 34 and therefore is capable of relieving more stress than the configuration shown in FIG. 1.

Figure 4:
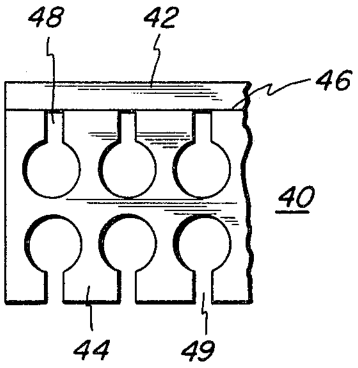
FIG. 4 is a side view of another alternative embodiment of the invention.

Another alternative configuration is shown in FIG. 4 wherein the duplex commutator bar 40 has a copper outer portion 42 bonded to a low carbon steel body 44 at interface 46. The plurality of upper expansion joints 48 and the plurality of lower expansion joints 49 now have the shape of round bottomed flasks. This configuration provides greater ability to reduce the stress concentration in the steel body 44.

Figure 5:
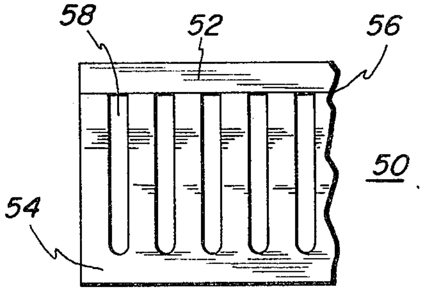
FIG. 5 is a side view of a further alternative embodiment of the invention.

A further alternative configuration is shown in FIG. 5 wherein the duplex bar 50 has a copper outer portion 52 bonded to a low carbon steel body 54 at interface 56. This configuration differs from those discussed hereinabove in that one plurality of expansion joints 58 extend perpendicularly only from the upper longitudinal surface of the body 54 to an interior portion of said body 54.

There are of course a number of different ways of reducing the stiffness of the steel body. Thus I have shown that the expansion joints may have different configurations including width, depth and spacing of the expansion joints. The specific dimensions depend on the geometry of the duplex bar.

It will be appreciated that the invention is not limited to the specific details shown in the examples and illustrations and that various modifications may be made within the ordinary skill in the art without departing from the spirit and scope of the invention.

I claim as my invention:

1. A duplex commutator bar resistant to interfacial delamination due to differential thermal expansion for mounting in an electrical commutator, said bar comprising an elongated iron base alloy body having an upper longitudinal surface and a lower longitudinal surface, a first plurality of spaced expansion joints extending from said upper longitudinal surface to an interior portion of said body, a second plurality of spaced expansion joints extending from said lower longitudinal surface to an interior portion of said body and a solid electrically conducting copper section bonded longitudinally to the upper longitudinal surface of said body along a plurality of separate interface regions between said body and said section.

2. The product of claim 1, wherein said section is electrolytic tough pitch copper and said body is low carbon steel.

3. The product of claim 1, wherein the first plurality of expansion joints and the second plurality of expansion joints are shaped as slots.

4. The product of claim 1, wherein said first plurality of expansion joints extend perpendicularly from said upper longitudinal surface and said second plurality of expansion joints extend perpendicularly from said lower longitudinal surface.

5. The product of claim 1, wherein said first plurality of expansion joints are uniformly spaced and said second plurality of expansion joints are uniformly spaced.

6. The product of claim 5, wherein said first plurality of uniformly spaced expansion joints and said second plurality of uniformly spaced expansion joints are symmetrically arranged in alternating fashion.

7. A duplex commutator bar resistant to interfacial delamination due to differential thermal expansion for mounting in an electrical commutator, said bar comprising an elongated iron-based alloy body having an upper longitudinal surface, a plurality of spaced expansion joints extending from said upper longitudinal surface to an interior portion of said body, and a solid electrically conducting copper section bonded longitudinally to the upper longitudinal surface of said body along a plurality of separate interface regions between said body and said section.

8. The product of claim 7, wherein said section is electrolytic tough pitch copper and body is low carbon steel.

9. The product of claim 7, wherein said plurality of expansion joints are shaped as slots.

10. The product of claim 9, wherein said plurality of spaced expansion joints extend perpendicularly from said upper longitudinal surface.

11. The product of claim 7, wherein said expansion joints are uniformly spaced.

12. The product of claim 11, wherein said plurality of uniformly spaced expansion joints extend perpendicularly from said upper longitudinal surface.

13. A duplex commutator bar resistant to interfacial delamination due to differential thermal expansion for mounting in an electrical commutator, said bar comprising an elongated iron base alloy body having an upper longitudinal surface and a lower longitudinal surface, a first plurality of spaced expansion joints extending from said upper longitudinal surface to an interior portion of said body, said first plurality of expansion joints being narrower towards said upper longitudinal surface and becoming wider toward the medial portion of said body, a second plurality of spaced expansion joints extending from said lower longitudinal surface to an interior portion of said body, said second plurality of expansion joints being narrower toward said lower longitudinal surface and becoming wider toward the medial portion of said body, and a solid electrically conducting copper section bonded longitudinally to the upper longitudinal surface of said body along a plurality of separate interface regions between said body and said section.

14. The product of claim 13, where said section is electrolytic tough pitch copper and said body is low carbon steel.

15. The product of claim 13, wherein said first plurality of expansion joints extend perpendicularly from said upper longitudinal surface and said second plurality of expansion joints extend perpendicularly from said lower longitudinal surface.

16. The product of claim 13, wherein said first plurality of expansion joints are uniformly spaced and said second plurality of expansion joints are uniformly spaced.

17. The product of claim 16, wherein said first plurality of uniformly spaced expansion joints and said second plurality of uniformly spaced expansion joints are symmetrically arranged in alternating fashion.

18. A duplex commutator bar resistant to interfacial delamination due to differential thermal expansion for mounting in an electrical commutator, said bar comprising an elongated iron base alloy body having an upper longitudinal surface and a lower longitudinal surface, a first plurality of spaced expansion joints extending from said upper longitudinal surface to an interior portion of said body, said first plurality of expansion joints being shaped in the form of a round bottomed flask, a second plurality of spaced expansion joints extending from said lower longitudinal surface to an interior portion of said body, said second plurality of expansion joints being shaped in the form of a round bottomed flask, and a solid electrically conducting copper section bonded longitudinally to the upper longitudinal surface of said body along a plurality of separate interface regions between said body and said section.

19. The product of claim 18, wherein said section is electrolytic tough pitch copper and said body is low carbon steel.

20. The product of claim 18, wherein said first plurality of expansion joints extend perpendicularly from said upper longitudinal surface and said second plurality of expansion joints extend perpendicularly from said lower longitudinal surface.

21. The product of claim 18, wherein said first plurality of expansion joints are uniformly spaced and said second plurality of expansion joints are uniformly spaced.

22. The product of claim 21, wherein said first plurality of uniformly spaced expansion joints and said second plurality of uniformly spaced expansion joints are symmetrically arranged in alternating fashion.

* * * * *